US008082307B2

(12) United States Patent
Wallis et al.

(10) Patent No.: US 8,082,307 B2
(45) Date of Patent: Dec. 20, 2011

(54) REDISTRIBUTING MESSAGES IN A CLUSTERED MESSAGING ENVIRONMENT

(75) Inventors: Graham Derek Wallis, West Wellow (GB); David Ware, Downton (GB)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 11/829,139

(22) Filed: Jul. 27, 2007

(65) Prior Publication Data

US 2008/0034051 A1 Feb. 7, 2008

(51) Int. Cl.
*G06F 15/16* (2006.01)
(52) U.S. Cl. ........ 709/206; 709/201; 709/203; 709/227; 719/313
(58) Field of Classification Search .......... 709/201–207, 709/226; 719/313
See application file for complete search history.

(56) References Cited

U.S. PATENT DOCUMENTS

| | | | | |
|---|---|---|---|---|
| 5,634,125 | A * | 5/1997 | Li ........................................... 1/1 |
| 7,050,432 | B1 * | 5/2006 | Banavar et al. ............... 370/390 |
| 7,177,917 | B2 * | 2/2007 | Giotta .......................... 709/219 |
| 7,519,669 | B2 * | 4/2009 | Nikolov ........................ 709/206 |
| 7,616,960 | B2 * | 11/2009 | Anke et al. .................... 455/450 |
| 7,634,583 | B2 * | 12/2009 | Sagar et al. ................... 709/250 |
| 7,640,357 | B2 * | 12/2009 | Kirov et al. ................... 709/233 |
| 2002/0120717 | A1 * | 8/2002 | Giotta .......................... 709/219 |
| 2002/0161604 | A1 * | 10/2002 | Kardos et al. ...................... 705/1 |
| 2003/0110232 | A1 * | 6/2003 | Chen et al. .................... 709/212 |
| 2006/0117041 | A1 * | 6/2006 | Ayres et al. ................... 707/100 |

OTHER PUBLICATIONS

Marc Fasbinder, Websphere MQ Workflow, Version 1.0, Jul. 22, 2003, IBM.*
Providing more processing power through clustered queue managers, by Andrew Banks, WebSphere MQ Development, IBM, pp. 1-12.*
Providing more processing power through clustered queue managers, by Andrew Banks, WebSphere MQ Development, IBM, pp. 1-13, Jul. 2002.*

* cited by examiner

*Primary Examiner* — Carl Colin
*Assistant Examiner* — Mohammad Siddiqi

(57) ABSTRACT

Messages are redistributed in a clustered messaging environment including messaging servers and consuming applications. Each messaging server has a queue partition operable to contain messages. Each consuming application can connect to a messaging server in to consume one or more messages from a queue partition local to that messaging server. A message on a holding queue partition local to a messaging server without at least one consumer interested in consuming that message is said to be marooned. A marooned message is redistributed from the holding queue partition to a messaging server that does have at least one consumer interested in consuming the message. The redistribution involves identifying a group of servers, each of which has one or more consumers interesting in consuming the message, selecting a server from the group and forwarding the message to the selected server.

14 Claims, 3 Drawing Sheets

REDISTRIBUTING MESSAGES IN A CLUSTERED MESSAGING ENVIRONMENT

BACKGROUND OF THE INVENTION

The invention relates to clustered messaging and more particularly to the consumption of messages in a clustered messaging environment.

A clustered messaging environment typically includes a number of messaging servers and a number of consuming applications. Each messaging server hosts a queue partition which contains messages and each consuming application connects to a messaging server in order to consume one or more messages.

In such a clustered messaging environment with multiple messaging servers, there are a number of situations which can occur.

It is possible for there to be too few consuming applications to enable all messaging servers to have an attached consumer.

It is also possible that although there are numerically sufficient consuming application instances for the number of messaging servers, the consumers are unevenly distributed across a cluster such that some messaging servers do not have a consumer attached.

A messaging server may have a consumer attached but that consumer may be using a filter that causes the consumer to receive only some of the messages at the messaging server.

A messaging server may have a consumer attached but that consumer may be running particularly slowly or at least more slowly than other consumers attached to different messaging servers.

The situations described above all result in messages arriving at those messaging servers remaining unconsumed or not being consumed in a timely manner. These messages are said to be "marooned".

BRIEF SUMMARY OF THE INVENTION

According to a first aspect, the invention is implemented as a method for redistributing messages in a clustered messaging environment including a plurality of messaging servers and a plurality of consuming applications. Each messaging server has a queue partition operable to contain messages. Each consuming application can connect to a messaging server in order to consume one or more messages from a queue partition local to that messaging server. A message on a holding queue partition local to a messaging server without at least one consumer interested in consuming that message is identified as a marooned message. A marooned message is redistributed from the queue partition in which it has been held to a queue partition local to a messaging server that has at least one consumer interested in consuming the messaging. The redistribution includes identifying a messaging server group consisting of messaging servers that have one or more attached consumers interested in consuming the marooned message, selecting a messaging server from the group and forwarding the marooned message to the selected messaging server.

The invention may also be implemented as an apparatus for redistributing messages in a clustered messaging environment having a plurality of messaging servers and a plurality of consuming applications. Each messaging server has a queue partition operable to contain messages. Each consuming application can connect to a messaging server in order to consume one or more messages from a queue partition local to that messaging server. A message on a holding queue partition local to a messaging server without at least one consumer interested in consuming that message is said to be marooned. The apparatus includes a computer processor, a receiving server component for receiving a message, a database component for storing information about messaging servers, including the messaging server at which the message is received, and about consumers attached to the messaging servers, and an accessing server component for accessing information stored in the database component. The accessing component identifies the message as a marooned message if there is no consumer interested in consuming the message attached to the messaging server that received the message. The apparatus further includes a selector server component that uses information stored in the database component to select a messaging server having an attached consumer interested in receiving the received message. The selector components forwards the message to the selected messaging server.

The invention may also implemented as a computer program product for redistributing messages in a clustered messaging environment. The computer program product includes a non-transitory computer usable storage medium having computer usable program code embodied therewith. The computer usable program code includes code configured to identify, as a marooned message, a message in the holding queue partition local to a messaging server that does not have at least one consumer interested in consuming the message. The computer usable program code further includes code configured to redistribute the identified marooned message from the holding partition queue to a queue partition local to a messaging server that does have at least one consumer interested in consuming the message. The computer usable program code configured to redistribute the marooned message further includes computer usable program code configured to identify a messaging server group consisting of messaging servers that have one or more attached consumers that interested in consuming the marooned message, computer usable program code configured to select a messaging server from the identified group of servers, and computer usable program code configured to forward the marooned message to the selected messaging server.

BRIEF DESCRIPTION OF THE SEVERAL VIEWS OF THE DRAWINGS

A preferred embodiment of the present invention will now be described, by way of example only, and with reference to the following drawings.

DETAILED DESCRIPTION OF THE INVENTION

Figure 1:
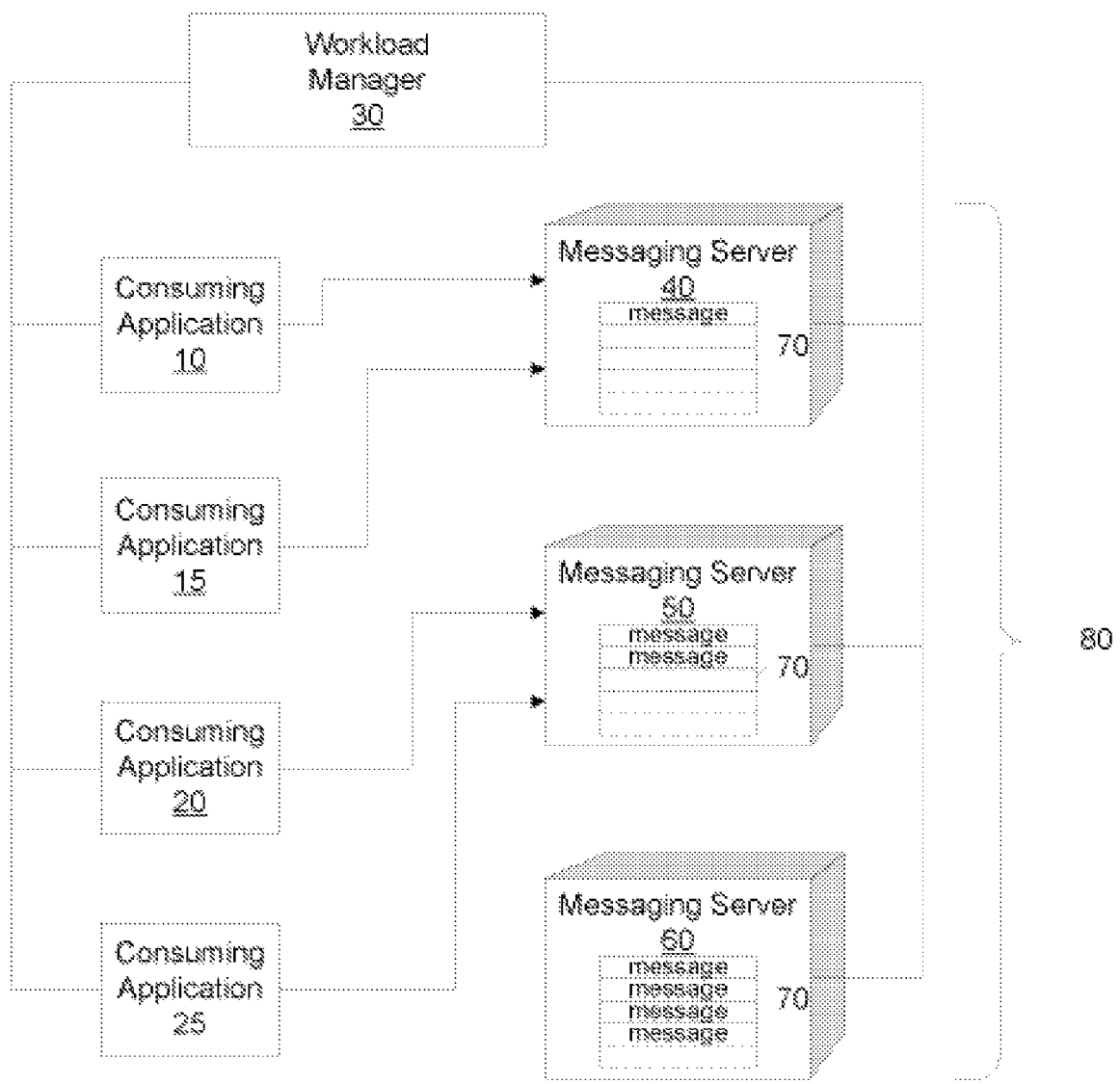
FIG. 1 illustrates an environment in which the present invention operates in accordance with a preferred embodiment of the present invention.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 illustrates the environment in which the present invention operates in accordance with a preferred embodiment. A plurality of consuming applications (consumers) 10, 15, 20, 25 are available for consuming messages from one of a plurality of messaging servers 40, 50, 60 in message cluster 80. A queue 70 is partitioned across the messaging servers in cluster 80 and each queue partition may hold one or more messages. A consuming application typically requests attachment to queue 70 and is informed by workload manager 30 which messaging server to attach to. The concurrent and asynchronous way in which consumers connect and disconnect makes it very difficult for the workload manager to keep accurate and up to date knowledge of the number of consumers attached to each messaging server. Consequently, it is possible to have an uneven distribution of consuming applications across messaging servers. For example, consuming applications 10 and 15 may attach to messaging server 40, while consuming applications 20 and 25 attach to messaging server 50. Messaging server 60 has a queue partition 70 containing four messages, and yet has no consuming application attached. Thus the messages residing on messaging server 60 are said to be "marooned". In this example, there are a sufficient number of consuming applications but the distribution is inefficient.

As indicated above, a situation may also arise in which there are too few consuming applications for the number of messaging servers. This can also lead to messages being marooned at a messaging server. Consumers may also not be using an appropriate filter for the consumption of certain messages. Finally there is the situation in which every queue partition has a consumer attached but one partition's consumers are processing messages extremely slowly (or at least more slowly than a consumer attached to another messaging server), while other consumers are "hungry" for messages. For the purposes of the discussion herein, such messages are also said to be marooned. A marooned message is said to have no consumers which are 'interested' in consuming the message attached to its local messaging server.

Two solutions are presented to the problem of marooned messages, a Push Model and a Pull Model. For ease of explanation these solutions will first be described mostly in terms of a messaging server having no consumers attached. This will subsequently be expanded upon to include the other situations described above.

Figure 2A:
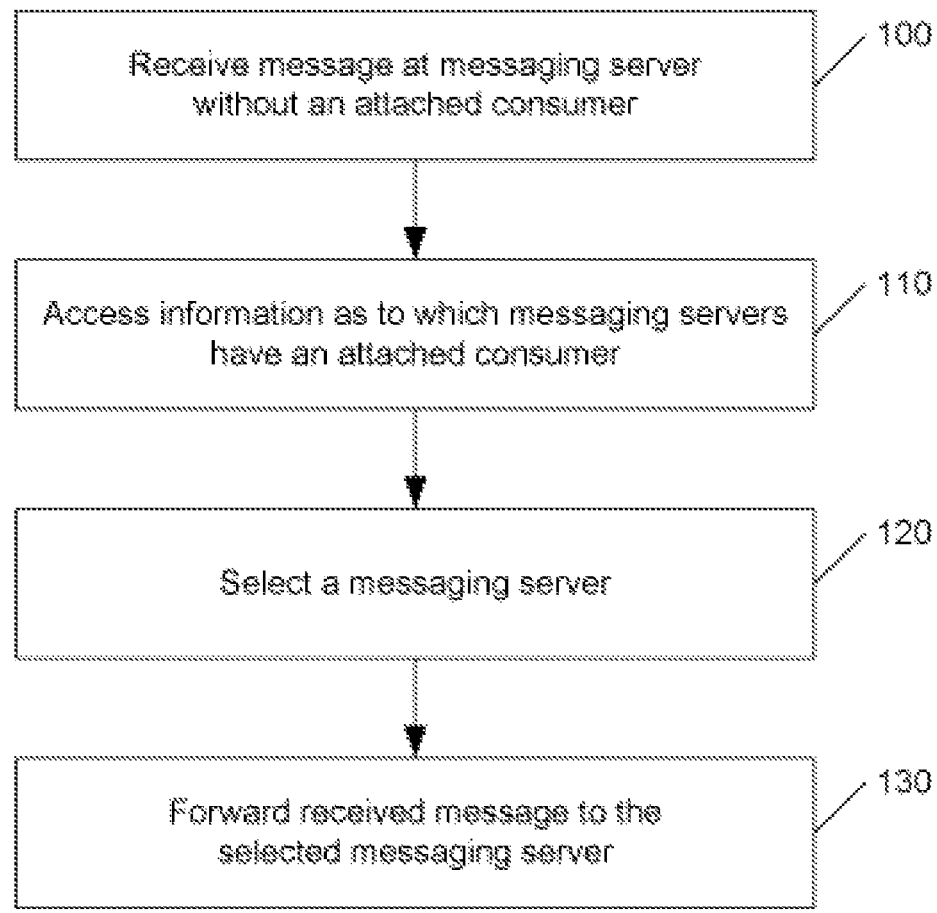
FIGS. 2a and 2b illustrate the processing and componentry of a first embodiment of the present invention.
Figure 2B:
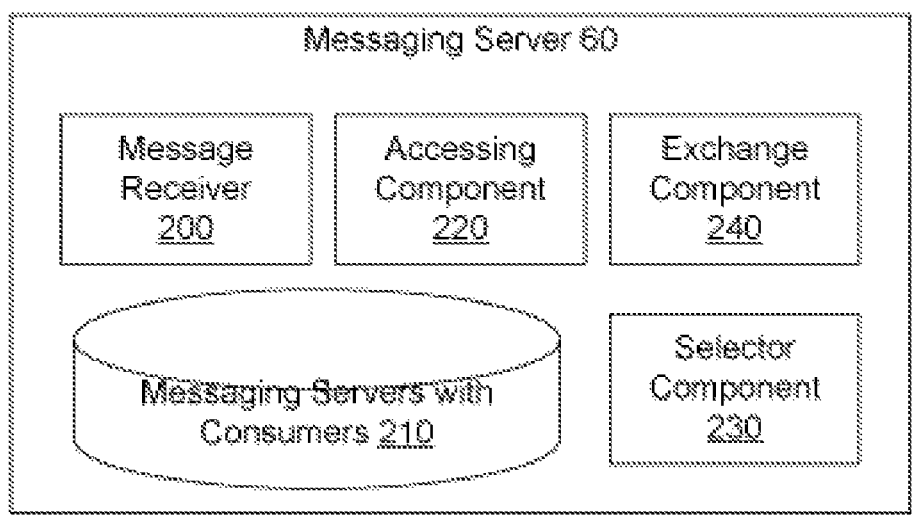

The Push Model will be described, in accordance with a first embodiment, with reference to FIGS. 2a and 2b. FIG. 2a illustrates the processing involved, while FIG. 2b depicts the componentry. Both figures should be read in conjunction with one another.

A message is received at a messaging server (message receiver 200) without an attached consumer at step 100. With reference to FIG. 1, this is messaging server 60. At step 110, it is determined which messaging servers do have one or more consumers attached. Messaging servers periodically exchange information (exchange component 240) relating to the consumers attached to each messaging server.

Messaging server 60 stores the information it receives from messaging servers 40 and 50 in database 210. Accessing component 220 uses database 210 in order to carry out step 110.

Having determined which of the messaging servers in cluster 80 has one or more active consuming applications attached, one of these messaging servers is selected at step 120 using selector component 230. Such a selection may, for example, be made on a round robin basis or may be random. It will be understood that the servers with attached consumers will change over time and so a round robin selection method must be adaptive. In one embodiment, database 210 stores information as to the number of consumers attached to each messaging server and possibly the level of workload that each server is managing. Such information may be used in deciding which messaging server to select at step 120.

Note that it would equally be possible for messaging servers to inform each other when they do not have active consumers. One server may eliminate such servers from the set of servers that it knows about in order to deduce which servers are appropriate for pushing marooned messages to.

In one embodiment, a group of messaging servers is informed that a marooned message is available and either they can perform some sort of arbitration to accept the message or the "pushing" server might select the first one in the group to respond.

It would also be possible to broadcast to the entire cluster that a marooned message is available and then to select a server from among those that responded.

Having selected a messaging server at step 110, the received message is forwarded on to the selected messaging server for consumption.

The embodiment has been described in terms of the processing performed on receipt of a message at a messaging server having no consumer attached. In another embodiment, such processing is performed periodically. This may result in one or more 'marooned messages' being sent to a first messaging server, with other marooned messages being sent to a different messaging server. Messages may be batched up and sent onto an appropriate messaging server.

Figure 3A:
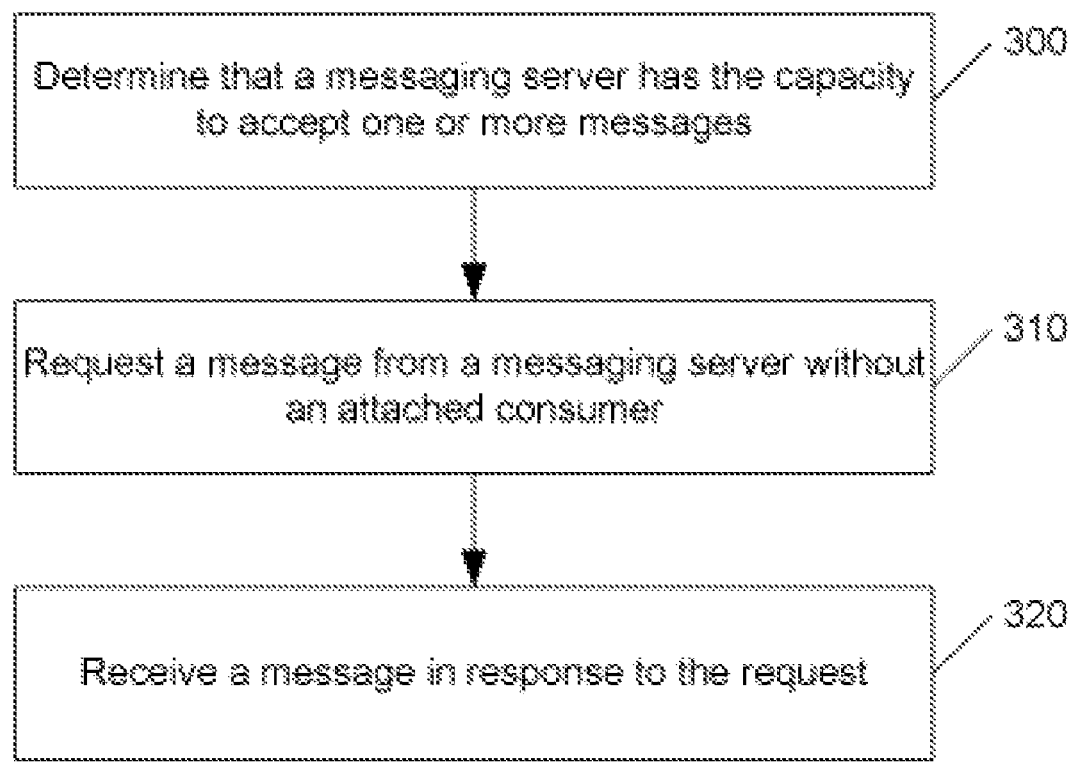
FIGS. 3a and 3b illustrate the processing and componentry of a second embodiment of the present invention.
Figure 3B:
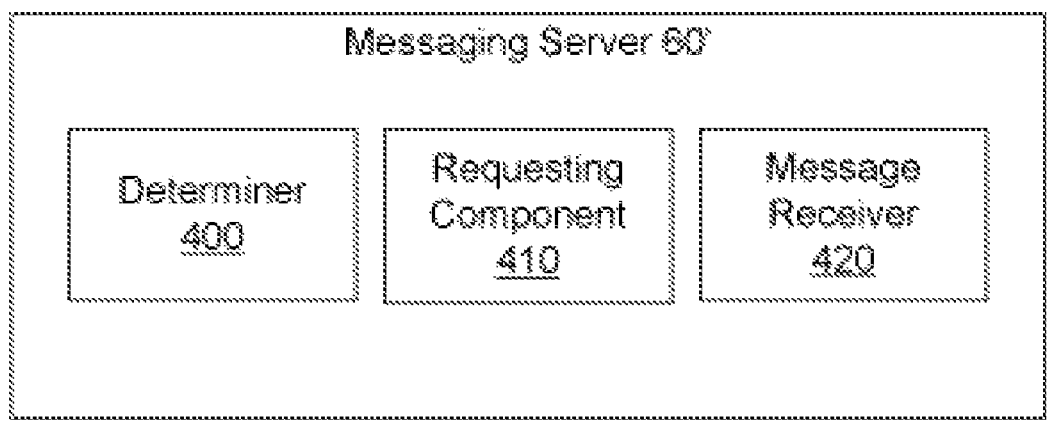

The Pull Model will be described, in accordance with a second embodiment, with reference to FIGS. 3a and 3b. FIG. 3a illustrates the processing involved, while FIG. 3b depicts the componentry used. Both figures should be read in conjunction with one another.

The processing of this embodiment is performed at a messaging server 60' having one or more consumers attached. At step 300 it is determined by determiner 400 that the messaging server has the capacity to accept one or more messages from another messaging server in cluster 80. Such a determination may be based on the number of messages on queue partition 70 for the particular messaging server and/or the number of consuming applications attached to the particular messaging server. For example, messaging server 40 has two messages on its local queue partition 70 AND has two actively consuming applications attached. Thus it may be determined that messaging server 40 has the capacity to accept 'marooned messages' from elsewhere.

At step 310 another message is requested using requesting component 410 from a messaging server without a consumer attached. This may involve broadcasting a request to all messaging servers in cluster 80 and leaving it up to each server to determine whether it is appropriate for them to respond to the request (e.g. whether a server has any consumers attached or not). There may be a plurality of messaging servers having marooned messages and therefore it may be appropriate for a broadcasting messaging server to indicate to the first server to respond that it is prepared to "pull" a message from that server.

Rather than broadcasting a request to the entire cluster, the requesting messaging server may have a record of all those messaging servers with consumers attached and thus be able to determine via the process of elimination which messaging servers do not have of consuming applications. In one alternative, the requesting messaging server may be periodically informed which messaging servers do not have consuming applications attached. The messaging server may then be able to target its request at a specific one of those messaging servers, or may send the request to the group of messaging servers and pull a message from the first one to respond.

In another embodiment a pulling messaging server may determine a group of messaging servers with marooned messages and use a random selection, a round robin selection within that group or the first messaging server to respond within that group. Of course the group of servers may change over time and so a round robin selection would need to be adaptive.

In the cases where a plurality of messaging servers have no consuming applications attached and have the ability to provide a message to the requesting messaging server, those messaging servers may instead arbitrate among themselves as to who in the group is to provide a message to the requesting messaging server.

However the message is provided, a message is received by the requesting messaging server at step 320 using message receiver 420.

Similar to the first embodiment, the processing of FIG. 3a may be performed periodically. This may result in one or more 'marooned messages' being "pulled" by a first messaging server, with other marooned messages being "pulled" by a different messaging server. Messages may be pulled as a batch.

The advantage of the solutions described above is no modification to the consuming application is required. Messages are redistributed within the cluster to those messaging servers that currently have consumers. If a message arrives at a messaging server (the "holding messaging server") that has no active consumer then the messaging server redirects that message to another messaging server that does have an active consumer. This is either done passively (pull model) or actively (in the push model). If no messaging servers have active consumers then the message is retained at the holding messaging server until at least one messaging server in the cluster does get an active consumer.

A "well-configured" cluster—one in which there are at least as many consumers as there are messaging servers and in which the consumers are well distributed across the messaging servers such that every messaging server has at least one consumer session—would not make any use of message redistribution. All messages would flow into one messaging server in the cluster and onwards to a locally connected consumer. Message redistribution allows imbalanced clusters or clusters with insufficient consumers to redirect messages to where the consumers are.

It should be appreciated that the relative location of the consumer to the messaging server is immaterial. The consumer may be running within an application server hosting the messaging server or may be communicating with the messaging server across a network.

While the description has been cast in terms of whether a messaging server has a consumer attached or not, this has been for ease of explanation only. The invention is concerned with any situation in which a messaging server has a marooned message due to the lack of a consumer that is able to consume that message in a timely manner.

For example, consuming applications may be selective as to the types of messages they are prepared to consume. In other words, consuming applications may be applying certain filters to their requests for messages. One consumer may be interested in a first stock price, while another may be concerned with a different stock price. When pushing messages out to a messaging server or when pulling messages from a messaging server, it may be necessary to take account of the types of consumers attached to the messaging servers in the cluster. For example, messaging server 60 may contain messages pertaining to the first stock. When deciding which of the other messaging servers in the cluster 80 to forward such stock messages on to, it may be necessary to determine whether the consuming applications attached to messaging servers 40 and 50 are interested in the first stock. The messaging servers may exchange information as to the type of consumers that they have attached. Alternatively, messaging server 60 may indicate that such messages are available and leave it to an appropriate messaging server to respond.

Equally, when a messaging server is looking for messages (pull model), it may have to take into account the consumers that it has attached.

Messaging server 60 may have consumers attached but they may not be the right kind of consumers (i.e. consumers interested in the type of messages on the queue partition). Consequently, even for a messaging server that does have consumers attached, it may still be appropriate to push messages to other messaging servers and to respond to pull requests from other messaging servers.

By way of another example, a messaging server may have a consumer attached, but that consumer may be running particularly slowly. For the purpose of the description, that consumer is said to be not interested in the message and consequently the message is marooned. In accordance with one embodiment, it is possible for a messaging server to determine that it has a backlog of one or more messages—for example, that a message has remained on the messaging server's queue partition for greater than x seconds. The messaging server can then choose to redistribute the message to another messaging server which has consumers 'hungry' for messages (push model). Whether a messaging server has consumers hungry for messages may be determined by asking the other messaging servers whether they have the capacity to accept another message. Such other messaging servers may then examine their current workload in order to be able to respond appropriately. In the pull model, a messaging server may determine that it has capacity and ask other messaging servers in the group whether they have any messages that have remained unconsumed for at least a certain amount of time.

In one embodiment, messaging servers exchange information as to the rate at which each attached consumer is consuming messages. For example, a particular consumer may be consuming a message every two seconds. Such information can be used to determine whether a consumer local to a message or a remote consumer is better placed to consume a message. Messages are preferably redistributed when it is discovered that another consumer at a remote messaging server would be able to consume the message in a more timely manner. Again, for the purposes of the discussion herein, a consumer that is unable to consume a message in a more timely manner than another consumer is said not to be interested in the message.

It should be appreciated that each messaging server would prefer to deliver messages to its local consumers and consumers may have a preference for messages from their local messaging server, but in the situation where a messaging server has no local consumers (or no local consumer able to consume them in a timely manner—"interested") it feeds each message to another messaging server that does have such a consumer. In this way, it is possible to ensure that all messages are consumed in a timely manner and no consumer is starved of messages.

The redistribution technique disclosed above would cause inefficiency in large-scale clusters having hundreds of well-distributed and hungry consumers. Thus user controls may be provided in order to switch off the technique disclosed. This may be more efficient for a very "popular" cluster since very little message redistribution is likely to be required and it may not be sensible to incur the overhead of each messaging server telling the others about its consumers (pull model) or its messages (push model). It may also be possible to autonomically determine that little benefit is being derived from the redistribution logic and automatically scale down the amount of overhead, possibly to the extent of turning the redistribution off.

The automatic scaling down may be achieved manually or automatically. It would be possible for the messaging system to maintain statistics relating to the number of messages that are flowing, how long they are waiting, how responsive ("hungry") the consumers attached to a particular partition are etc. A user could look at this performance information and decide that they want to manually configure the system to disable the message redistribution. The automatic alternative is that the system could make this judgment itself, based on the same data.

It should be appreciated that a system may be provided in which both the push and pull models operate.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for redistributing messages in a clustered messaging environment comprising a plurality of messaging servers and a plurality of consuming applications, each messaging server having a queue partition operable to contain messages, each consuming application operable to connect to a messaging server in order to consume one or more messages from a queue partition local to that messaging server, the method comprising:
   identifying, as a marooned message, a message in a holding queue partition local to a messaging server not having at least one consumer interested in consuming said message; and
   redistributing the identified marooned message from the holding queue partition to a queue partition local to a messaging server that does have at least one consumer interested in consuming the message, wherein redistributing the identified marooned message further comprises
   identifying a messaging server group consisting of messaging servers that have one or more attached consumers that are interested in consuming the marooned message,
   selecting a messaging server from the identified messaging server group, and forwarding the marooned message to the selected messaging server.

2. The method of claim 1, wherein redistributing the identified marooned message from the holding queue partition to a queue partition local to a messaging server that does have at least one consumer interested in consuming the message further comprises pushing the marooned message to a messaging server having at least one consumer interested in consuming the message.

3. The method of claim 2 comprising:
   broadcasting to the plurality of messaging servers that a marooned message is available for consumption; and
   receiving an indication of at least one messaging server that has a consumer attached that is interested in consuming the marooned message.

4. The method of claim 2 comprising:
   batching marooned messages; and
   redistributing a batch of marooned messages to a messaging server which does have at least one consumer interested in consuming the batch.

5. The method of claim 1, wherein redistributing the identified marooned message from the holding queue partition to a queue partition local to a messaging server that does have at least one consumer interested in consuming the message comprises pulling the marooned message from a messaging server without an interested consumer to a messaging server that does have at least one consumer interested in consuming the message.

6. The method of claim 5, wherein the pulling the marooned message from a messaging server without an interested consumer to a messaging server that does have at least one consumer interested in consuming the message comprises determining that the pulling messaging server has the capacity to accept one or more messages.

7. The method of claim 6 comprising selecting a messaging server having marooned messages from a group of messaging servers having marooned messages.

8. The method of claim 7 comprising:
   broadcasting to the plurality of messaging servers that capacity exists to process a marooned message; and
   allowing the messaging servers to determine which of them should respond.

9. Apparatus for redistributing messages in a clustered messaging environment comprising a plurality of messaging servers and a plurality of consuming applications, each messaging server having a queue partition operable to contain messages, each consuming application operable to connect to a messaging server in order to consume one or more messages from a queue partition local to that messaging server, wherein a message on a holding queue partition local to a messaging server without at least one consumer interested in consuming that message is said to be marooned, the apparatus comprising:
   a computer processor;
   a receiving server component for receiving a message;
   a database component for storing information about messaging servers in the clustered messaging environment, including the messaging server at which said message is received, and about consumers attached to the messaging servers;
   an accessing server component for accessing information stored in the database component, said accessing component identifying said message as a marooned message if no consumer interested in consuming the receiving message is attached to the messaging server that received said message; and
   a selector server component for using information stored in said database component to select a messaging server in said clustered messaging environment having an attached consumer interested in receiving the received message and forwarding said received message to said different messaging server, said selector component forwarding said marooned message to said selected messaging server.

10. A computer program product for redistributing messages in a clustered messaging environment, the computer program product comprising:
    a non-transitory computer usable storage medium having computer usable program code embodied therewith, the computer usable program code comprising:
    computer usable program code configured to identify, as a marooned message, a message in a holding queue partition local to a messaging server not having at least one consumer interested in consuming said message; and
    computer usable program code configured to redistribute the identified marooned message from the holding queue partition to a queue partition local to a messaging server that does have at least one consumer interested in consuming the message, said computer usable program code configured to redistribute the identified marooned message further comprising
    computer usable program code configured to identify a messaging server group consisting of messaging servers that have one or more attached consumers that are interested in consuming the marooned message,
    computer usable program code configured to select a messaging server from the identified messaging server group, and
    computer usable program code configured to forward the marooned message to the selected messaging server.

11. The computer program product of claim 10 wherein the computer usable program code configured to redistribute the identified marooned message from the holding queue partition to a queue partition local to a messaging server that does have at least one consumer interested in consuming the message further comprises computer usable program code configured to push the marooned message out to a messaging server having at least one consumer interested in consuming the message.

12. The computer program product of claim 10 wherein the computer usable program code configured to redistribute the identified marooned message from the holding queue partition to a queue partition local to a messaging server that does have at least one consumer interested in consuming the message further comprises computer usable program code configured to pull the marooned message from a messaging server without an interested consumer to a messaging server that does have at least one consumer interested in consuming the message.

13. The computer program product of claim 12 wherein the computer usable program code configured to pull the marooned message from a messaging server without an interested consumer to a messaging server that does have at least one consumer interested in consuming the message further comprises computer usable program code configured to determine that the pulling messaging server has the capacity to accept one of more messages.

14. The computer program product of claim 13 wherein the computer usable program code configured to determine that the pulling messaging server has the capacity to accept one of more messages further comprises:
    computer usable program code configured to broadcast to the plurality of messaging servers that capacity exists to process a marooned message; and
    computer usable program code configured to allow the messaging servers to determine which of them should respond.

\* \* \* \* \*